(12) United States Patent
Childress, Jr. et al.

(10) Patent No.: US 11,695,900 B2
(45) Date of Patent: *Jul. 4, 2023

(54) SYSTEM AND METHOD OF DYNAMIC, NATURAL CAMERA TRANSITIONS IN AN ELECTRONIC CAMERA

(71) Applicant: Plantronics, Inc., Santa Cruz, CA (US)

(72) Inventors: Rommel Gabriel Childress, Jr., Austin, TX (US); Alain Elon Nimri, Austin, TX (US); Stephen Paul Schaefer, Cedar Park, TX (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,813

(22) Filed: Jul. 14, 2021

(65) Prior Publication Data

US 2021/0360193 A1  Nov. 18, 2021

Related U.S. Application Data

(63) Continuation of application No. 16/993,651, filed on Aug. 14, 2020, now Pat. No. 11,095,849, which is a continuation of application No. 16/585,719, filed on Sep. 27, 2019, now Pat. No. 10,778,941.

(51) Int. Cl.
  *H04N 7/14* (2006.01)
  *H04N 7/15* (2006.01)
  *H04L 12/18* (2006.01)

(52) U.S. Cl.
  CPC ............. *H04N 7/142* (2013.01); *H04N 7/155* (2013.01); *H04L 12/1813* (2013.01); *H04N 7/147* (2013.01)

(58) Field of Classification Search
  CPC .......... H04N 7/142; H04N 7/147; H04N 7/15; H04L 12/1813
  USPC ... 348/14.01, 14.08, 14.09, 211.12, 158, 595
  See application file for complete search history.

(56) References Cited

U.S. PATENT DOCUMENTS

| | | | |
|---|---|---|---|
| 9,723,309 B2 * | 8/2017 | Liao ..................... | H04N 19/142 |
| 2013/0300939 A1 * | 11/2013 | Chou ..................... | G06V 20/49 348/700 |
| 2014/0085404 A1 | 3/2014 | Kleinsteiber et al. | |
| 2016/0295128 A1 | 10/2016 | Schnittman et al. | |

(Continued)

OTHER PUBLICATIONS

PCT/US2020/052523 International Search Report and Written Opinion of the International Searching Authority, dated Dec. 9, 2020.

*Primary Examiner* — Yosef K Laekemariam
(74) *Attorney, Agent, or Firm* — Quarles & Brady LLP

(57) ABSTRACT

Scene changes should be done pleasingly and without user input or control. Based on the number of speakers and changes in speakers, either to a different individual or movement by the same speaker, based on the locations of the speakers, and based on the overlap of the current and intended scenes, a decision is made whether to perform a smooth transition or do a cut. It has been determined that the decision on cut versus smooth transition is preferably based on the location of the center of the intended new scene versus the boundaries of the current scene, a cut used if the center is outside the boundaries and a smooth transition if inside. If a smooth transition, an easing function, such as ease in ease out, is performed to change the scene. A preferred value for the smooth transition is to perform the transition over 80 frames.

20 Claims, 9 Drawing Sheets

(56) References Cited

U.S. PATENT DOCUMENTS

2017/0111595 A1 4/2017 Soni et al.
2018/0335921 A1 11/2018 Karunamuni et al.
2019/0199967 A1 6/2019 Tangeland et al.

* cited by examiner

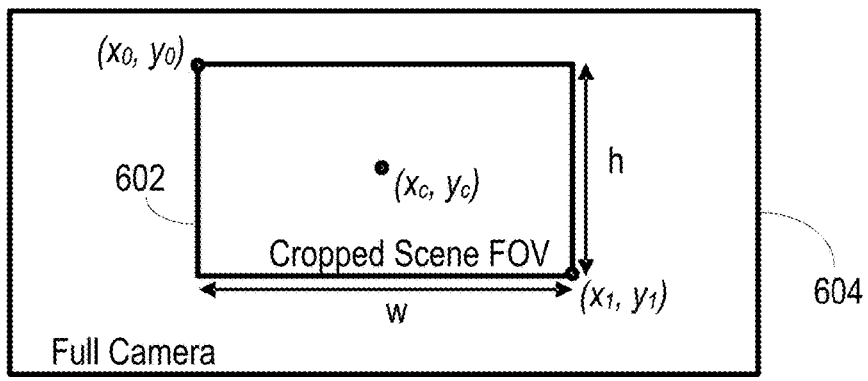
FIG. 6
Easing Functions
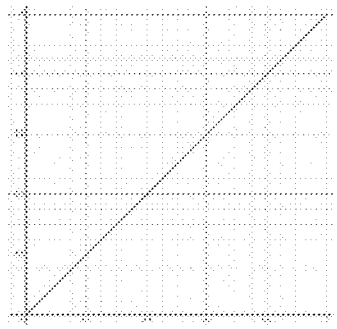
Linear: f(t) = t
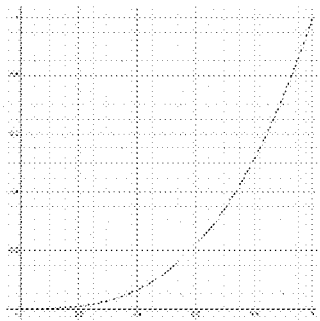
Ease In: f(t) = t³
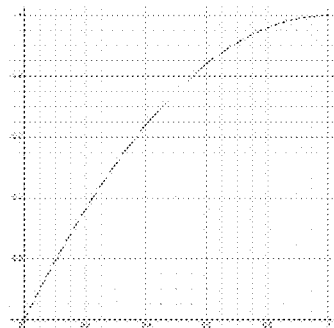
Ease Out: f(t) = 2t − t²
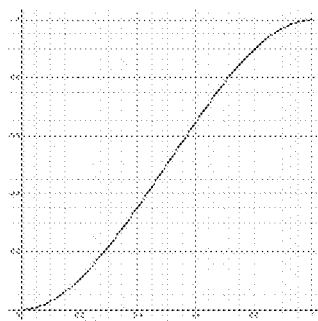
Ease In Ease Out x1:
f(t) = 3t² − 2t³
FIG. 7
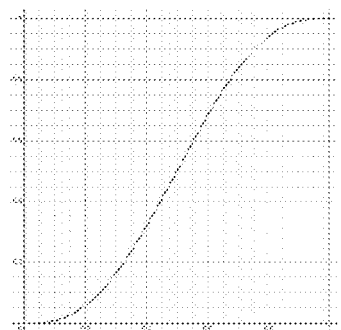
Ease In Ease Out x2:
f(t) = 6t⁵ − 15t⁴ + 10t

SYSTEM AND METHOD OF DYNAMIC, NATURAL CAMERA TRANSITIONS IN AN ELECTRONIC CAMERA

CROSS-REFERENCE TO RELATED APPLICATION

This application is a continuation of U.S. Ser. No. 16/993,651, filed Aug. 14, 2020, which is a continuation of U.S. Ser. No. 16/585,719, filed Sep. 27, 2019, now U.S. Pat. No. 10,778,941, the contents of which are incorporated herein in their entirety by reference.

BACKGROUND

Typically, a camera in a videoconference captures a view that fits all the participants. Unfortunately, far-end participants may lose much of the value in the video because the size of the near-end participants displayed at the far-end may be too small. In some cases, the far-end participants cannot see the facial expressions of the near-end participants and may have difficulty determining who is actually speaking. These problems give the videoconference an awkward feel and make it hard for the participants to have a productive meeting.

To deal with poor framing, participants have to intervene and perform a series of operations to pan, tilt, and zoom the camera to capture a better view. As expected, manually directing the camera with a remote control can be cumbersome. Sometimes, participants just do not bother adjusting the camera's view and simply use the default wide shot. Of course, when a participant does manually frame the camera's view, the procedure has to be repeated if participants change positions during the videoconference or use a different seating arrangement in a subsequent videoconference.

Voice-tracking cameras having microphone arrays can help direct cameras during a videoconference toward participants who are speaking. Although these types of cameras are very useful, they can encounter some problems. When a speaker turns away from the microphones, for example, the voice-tracking camera may lose track of the speaker. In a very reverberant environment, the voice-tracking camera may direct at a reflection point rather than at an actual sound source. Typical reflections can be produced when the speaker turns away from the camera or when the speaker sits at an end of a table. If the reflections are troublesome enough, the voice-tracking camera may be guided to point to a wall, a table, or other surface instead of the actual speaker.

One solution, as disclosed in U.S. Pat. No. 8,248,448, which is hereby incorporated by reference, was to use two different cameras, one used for a wide shot and one used for speaker shots. The speaker view was aimed based on voice-tracking, while the wide shot remained fixed. The wide shot was used when transitioning the speaker view camera between speakers. When the speaker view camera had relocated to the new speaker, the speaker view camera image was used. This wide view/speaker view arrangement allowed for changing speakers being viewed without disturbing motions, but it did require the use of two cameras.

For these reasons, it is desirable during a videoconference to be able to tailor the view of participants dynamically based on the meeting environment, arrangement of participants, and the persons who are actually speaking. The subject matter of the present disclosure is directed to overcoming, or at least reducing the effects of, one or more of the problems set forth above.

SUMMARY

In embodiments according to the present invention, scene changes are done pleasingly and without user input or control. Based on the number of speakers and changes in speakers, either to a different individual or movement by the same speaker, based on the locations of the speakers, and based on the overlap of the current and intended scenes, a decision is made whether to perform a smooth transition or do a cut. It has been determined that the decision on cut versus smooth transition is preferably based on the location of the center of the intended new scene versus the boundaries of the current scene, a cut is used if the center is outside the boundaries and a smooth transition if inside. If a smooth transition is to be performed, an easing function, preferably an ease in ease out function, is performed to change the scene. It has also been determined that a preferred value for the smooth transition is to perform the transition over 80 frames, though values of 60-100 frames is also suitable to provide a pleasant viewing experience, assuming operating at 30 frames per second.

BRIEF DESCRIPTION OF THE DRAWINGS

FIG. 6 illustrates dimensioning of a cropped scene in a videoconference in relation to a full scene.

FIG. 7 illustrates various easing functions used in transitioning a scene according to the present invention.

DETAILED DESCRIPTION

Figure 1:
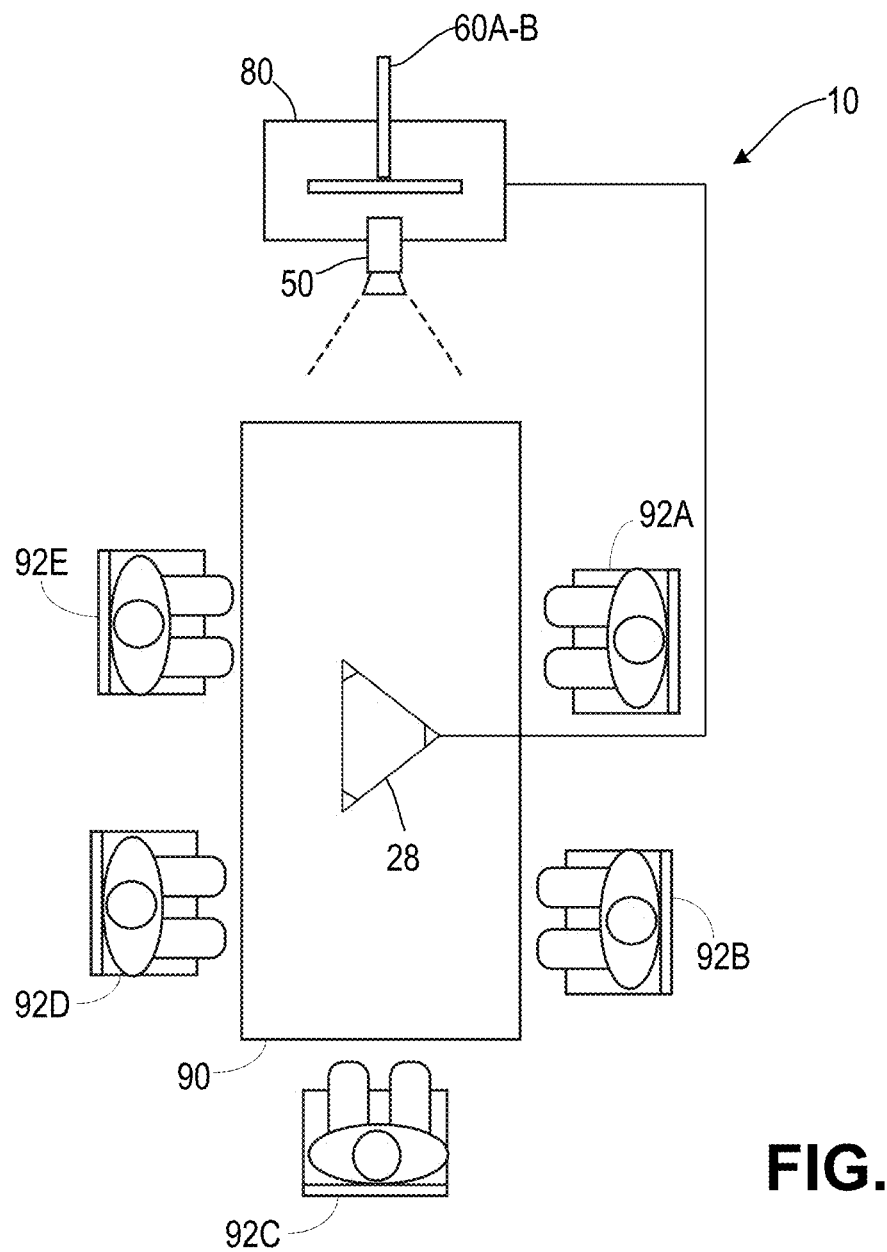
FIG. 1 illustrates a conference room containing several people and a videoconferencing endpoint according to the present invention.

In the plan view of FIG. 1, one arrangement of a videoconferencing endpoint 10 uses a videoconferencing device 80 having microphone arrays 60A-B and a camera 50 integrated therewith. A microphone pod 28 can be placed on a table 90, although other types of microphones, such as ceiling microphones, individual table microphones, and the like, can be used. The microphone pod 28 communicatively connects to the videoconferencing device 80 and captures audio for the videoconference. For its part, the videoconferencing device 80 can be incorporated into or mounted on a display and/or a videoconferencing unit (not shown). Five individuals 92A-92E are seated around the table 90.

Figure 2:
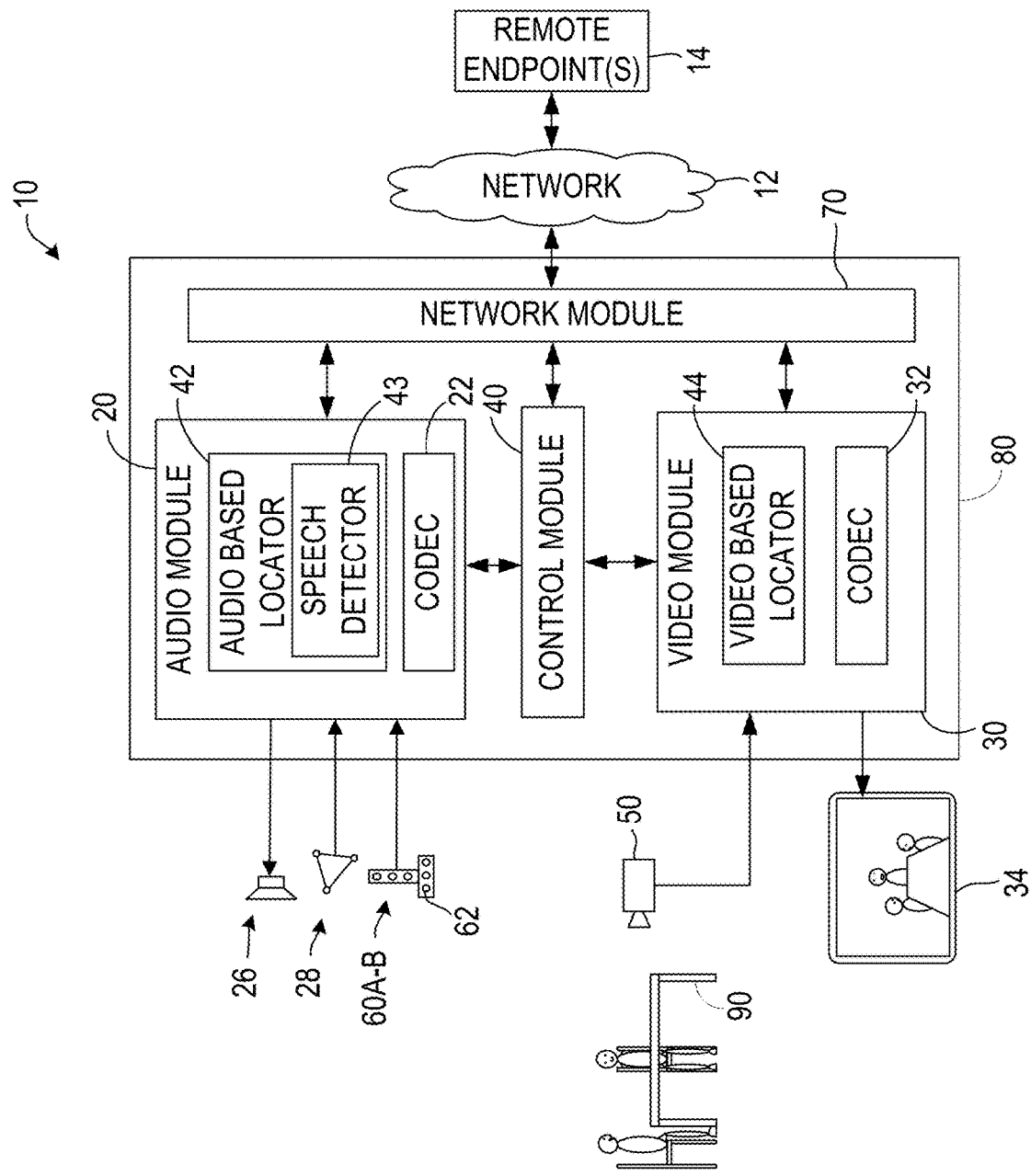
FIG. 2 is a first block diagram of the videoconferencing endpoint of FIG. 1.

As seen in FIG. 2, the videoconferencing apparatus or endpoint 10 in FIG. 1 communicates with one or more remote endpoints 14 over a network 12. Among some common components, the endpoint 10 has an audio module 20 with an audio codec 22 and has a video module 30 with a video codec 32 and a video based location 44. These modules 20/30 operatively couple to a control module 40 and a network module 70.

During a videoconference, a camera 50 captures video and provides the captured video to the video module 30 and video codec 32 for processing. Preferably the camera 50 is an electronic pan-tilt-zoom (EPTZ) camera. Additionally, one or more microphones in the microphone pod 28 capture audio and provide the audio to the audio module 20 and audio codec 22 for processing. The endpoint 10 uses the audio captured with the microphone pod 28 and ceiling mounted microphones and the like primarily for the conference audio.

Separately, microphone arrays 60A-B having orthogonally arranged microphones 62 also capture audio and provide the audio to the audio module 20 for processing. Preferably, the microphone arrays 60A-B include both vertically and horizontally arranged microphones 62 for determining locations of audio sources during the videoconference. Therefore, the endpoint 10 uses the audio from these arrays 60A-B primarily for camera tracking purposes and not for conference audio, although their audio could be used for the conference.

After capturing audio and video, the endpoint 10 encodes it using any of the common encoding standards, such as MPEG-1, MPEG-2, MPEG-4, H.261, H.263, H.264 and H.265. Then, the network module 70 outputs the encoded audio and video to the remote endpoints 14 via the network 12 using any appropriate protocol. Similarly, the network module 70 receives conference audio and video via the network 12 from the remote endpoints 14 and sends these to their respective codec 22/32 for processing. Eventually, a loudspeaker 26 outputs conference audio, and a display 34 outputs conference video. Many of these modules and other components can operate in a conventional manner well known in the art so that further details are not provided here.

Figure 3:
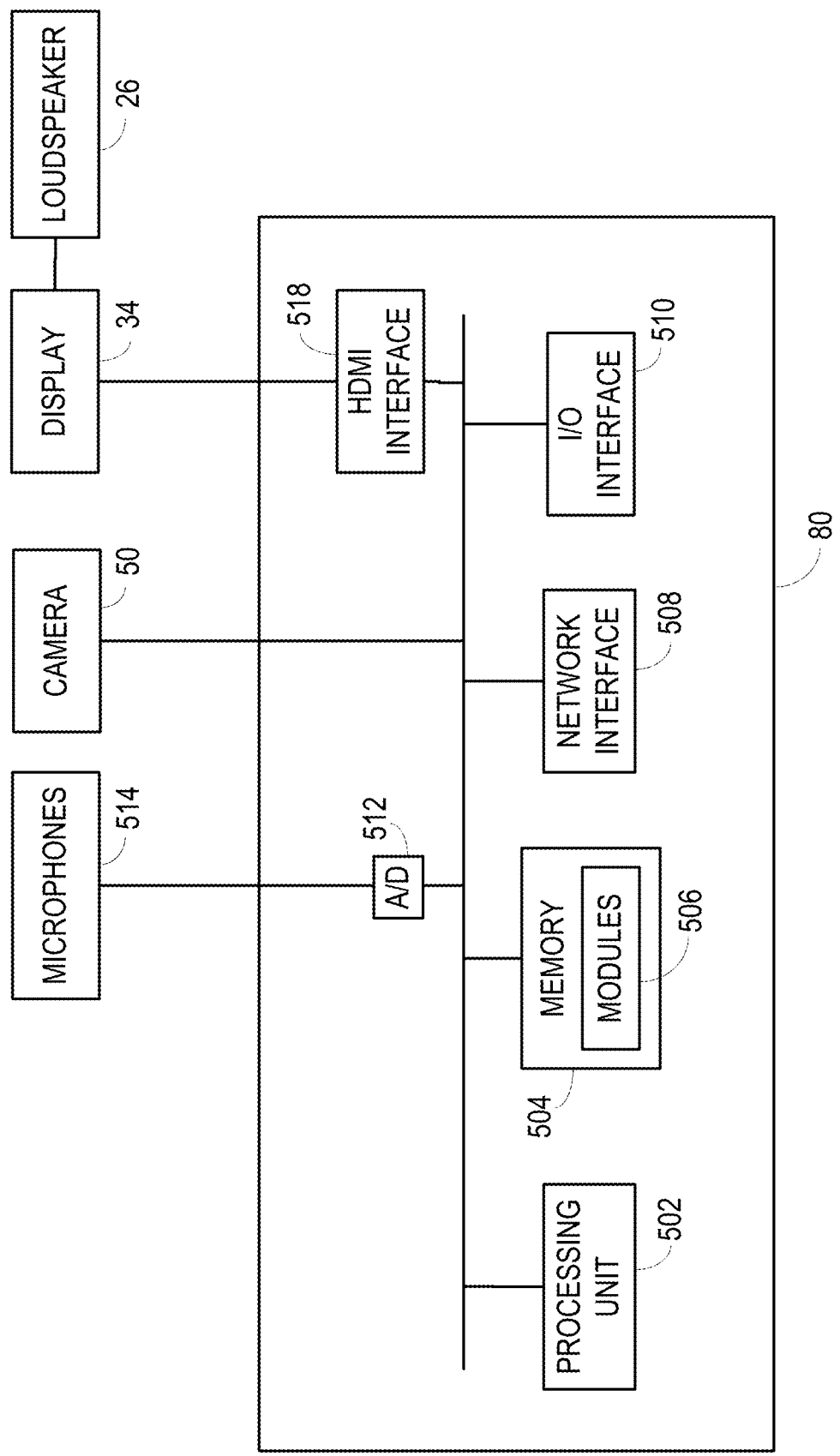
FIG. 3 is a second block diagram of the videoconferencing endpoint of FIG. 1.

FIG. 3 is a hardware-focused block diagram of the endpoint 10. An exemplary videoconferencing device 80 includes a processing unit 502, such as a Digital Signal Processor (DSP) or central 4 of 15 processor unit (CPU) or combination thereof, to perform the desired audio and video operations. A memory 504, which has both volatile and non-volatile portions, includes programs to perform desired modules 506, such as the audio module 20, the video module 30, and the control module 40, as well as various other audio and video modules, is connected to the processing unit 502. A network interface 508, such as an Ethernet interface, is connected to the processing unit 502 to allow communication with the far end. An input/output (I/O) interface 510 is connected to the processing unit 502 to perform any needed I/O operations. An A/D converter block 512 is connected to the processing unit 502 and to microphones 514. The microphones 514 include the microphone pod 28 and the directional microphone or microphones 60A, 60B. A camera 50 is connected to the processing unit 502 to provide near end video. An HDMI interface 518 is connected to the processing unit 502 and to a display 34 to provide video and audio output, the display 34 including the loudspeaker 26. It is understood that this is a very simplified diagram of a videoconferencing device 80 and many other designs are possible.

Figure 4:
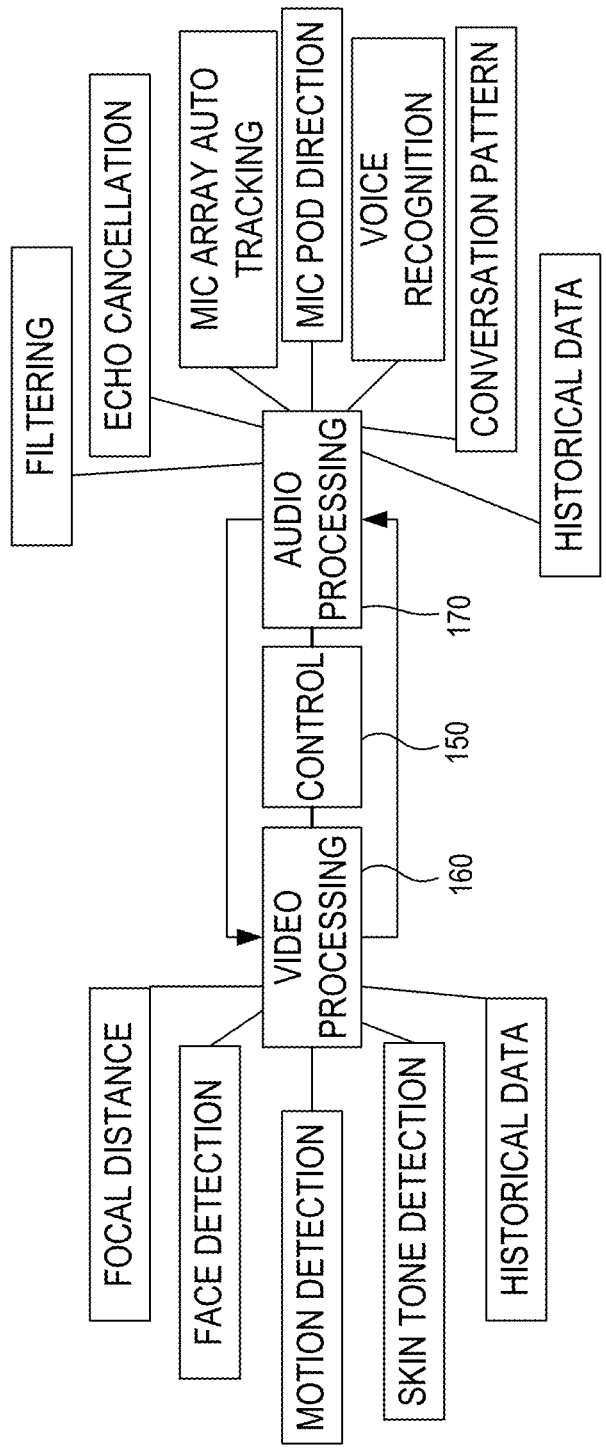
FIG. 4 is a third diagram of the videoconferencing endpoint of FIG. 1 illustrating various functions performed by the videoconferencing endpoint.

With an understanding of the videoconferencing endpoint and components described above, discussion now turns to operation of the disclosed endpoint 10. First, FIG. 4 shows a control scheme 150 used by the disclosed endpoint 10 to conduct a videoconference. As intimated previously, the control scheme 150 uses both video processing 160 and audio processing 170 to control operation of the camera 50 during the videoconference. The video processing 160 and audio processing 170 can be done individually or combined together to enhance operation of the endpoint 10. Although briefly described below, several of the various techniques for audio and video processing 160 and 170 are discussed in more detail later. The control scheme 150, the video processing 160, and the audio processing 170 are preferably programs stored in the modules 506 and executed on the processing unit 502.

Briefly, the video processing 160 can use focal distance from the camera 50 to determine distances to participants and can use video-based techniques based on color, motion, and facial recognition to track participants. As shown, the video processing 160 can, therefore, use motion detection, skin tone detection, face detection, and other algorithms to process the video and control operation of the camera 50. Historical data of recorded information obtained during the videoconference can also be used in the video processing 160.

For its part, the audio processing 170 uses speech tracking with the microphone arrays 60A-B. To improve tracking accuracy, the audio processing 170 can use a number of filtering operations known in the art. For example, the audio processing 170 preferably performs echo cancellation when performing speech tracking so that coupled sound from the endpoint's loudspeaker is not picked up as if it is a dominant speaker. The audio processing 170 also uses filtering to eliminate non-voice audio from voice tracking and to ignore louder audio that may be from a reflection.

The audio processing 170 can use processing from additional audio cues, such as using a tabletop microphone element or pod (28; FIG. 1). For example, the audio processing 170 can perform voice recognition to identify voices of speakers and can determine conversation patterns in the speech during the videoconference. In another example, the audio processing 170 can obtain direction (i.e., pan) of a source from a separate microphone pod (28) and combine this with location information obtained with the microphone arrays 60A-B. Because the microphone pod (28) can have several microphones positioned in different directions, the position of an audio source relative to those directions can be determined.

When a participant initially speaks, the microphone pod (28) can obtain the direction of the participant relative to the microphone pod (28). This can be mapped to the participant's location obtained with the arrays (60A-B) in a mapping table or the like. At some later time, only the microphone pod (28) may detect a current speaker so that only its directional information is obtained. However, based on the mapping table, the endpoint 10 can locate the current speaker's location (pan, tilt, zoom coordinates) for framing the speaker with the camera 50 using the mapped information.

It is understood that the above is a description of one embodiment of a videoconferencing device 80 and endpoint 10 and other configurations of microphones, cameras, processors, and the like can be used to provide speaker location determinations and the various views.

Figure 5:
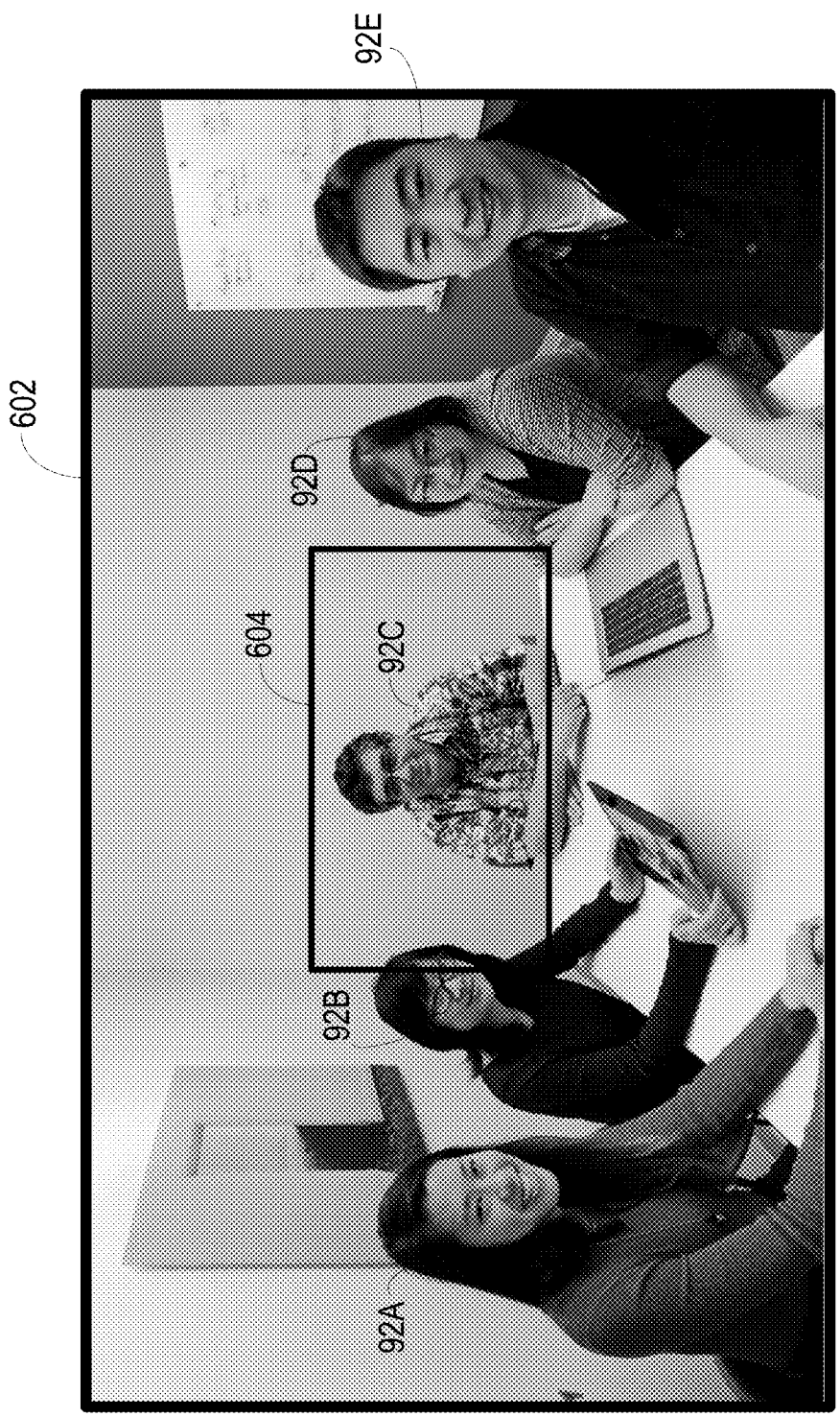
FIG. 5 illustrates a full scene and a cropped scene in a videoconference.

Referring now to FIGS. 5 and 6, views of the preferred EPTZ camera 50 are illustrated. The resolution of modern electronic cameras has gotten high enough that even cropped portions of a scene provide sufficient resolution to provide an enjoyable videoconference. A full camera view 602 may contain as many as 3840×2160 pixels (known as 4K). A cropped scene 604 may then readily have 1920×1080 pixels (known as HD). The cropped scene 604 field of view (FOV) has a height h and a width w and a center Xe, Ye●. The upper left corner of the cropped scene 604 has a coordinate value of $x_0$, $y_0$, referenced to 0,0 at the upper left corner of the full camera view 602. The lower right corner then has a coordinate value of X1, Y1●.

In FIG. 5, individual 92C is the speaker, so the cropped scene 604 is framed on individual 92C. If individual 92C stops speaking or a different individual begins speaking, the cropped scene 604 changes location or a full camera view 602 is used. However, how the view changes can have an effect on the videoconference. Moving a cropped view a large distance at a high rate of speed is disorienting. Similarly, cutting between cropped views that are close is also disorienting. Additionally, it is well known that changing the view too often is also disorienting. Embodiments according to the present invention utilize rules to determine how to move between camera views, such as full camera view to a cropped view, a cropped view to a full camera view, and between two cropped view locations. The rules provide for an enjoyable experience with a minimum of disorientation. The rules of interest in this disclosure are rules relating to view movement and view cuts, the changing view rules being similar to prior rules.

Addressing movement first, when considering a transition between two scenes (scene A and scene B), an EPTZ transition is created by specifying a distinct cropped scene or view for each frame of the transition. The variables for each subsequent box are varied by a certain amount over time to execute a controlled transition. The speed and acceleration of the effective motion is defined by how much change is applied per frame.

One method for transitioning a variable v from values A to B over a certain time is to normalize the value range for (t) and apply an interpolation function. The normalized output of this function can be applied to the range of values (vJ) for each instance of the transition. The interpolation function ($f(t)$) chosen will define the characteristic of the perceived motion as the variable (v) changes.

In the case of EPTZ camera motion, if this technique is simultaneously applied to the center point (x, y) and size (w, h) variables used to describe two camera scenes (A, B), the perceived motion effect through the transition will be equivalent to the prescribed interpolation function.

The motion effect commonly used in graphical animations when applied to a video output is used to simulate natural camera movement. In embodiments according to the present invention, the function is applied dynamically so that the endpoint selects the appropriate type of motion at run-time and changes the characteristic as a human operator would. Acceleration, deceleration, and velocity become inherent characteristics of the chosen function and transition duration rather than complex input parameters.

Referring to FIG. 7, the simplest function is a linear function $f(t)=t$ but the linear function transitions between scenes with an abrupt start/stop and even velocity and so is not pleasant to experience.

There are endless polynomial and trigonometric equations which will generate different types of motion with unique acceleration and deceleration. These can be collectively referred to as "Easing Functions." Various easing functions are illustrated in FIG. 7.

A primary decision in calculating the parameters for the motion effect is deciding how much time the transition should take to complete. Too fast is dizzying and too slow is tedious. The time determines the number of "steps" to iterate through to complete the transition effect. Since this is applied to a camera video stream, the preferred approach is to base the value on the frame rate of the camera (fps or frames per second). For instance, if a 2 second transition is desired for a camera with a frame rate of 30 fps, then the number of steps (S) is 60. Once the overall number of steps is determined, the easing function is applied to the four variables, x, y, h, and w, simultaneously to determine the bounding box to use for each frame through the transition.

The example below takes 60 frames to apply the EASE_IN $f(t)=ts$ transition from Scene A to Scene B. The scenes are defined in Table 1.

TABLE 1

| Scene A | Scene B |
| --- | --- |
| Center point: $(x_A, y_A)$ | Center point: $(x_B, y_B)$ |
| Width: $w_A$ | Width: $w_B$ |
| Height: $h_A$ | Height: $h_B$ |

The following pseudo-code sample performs the critical calculation:

```
#define EASE_IN(t) t * t * t
#defineS 60
for (i=0; i <= S; i++)
{
    t = i/S;
    f = EASE_IN(t);
    x_i = (x_A * (1.0 - f)) + (x_B * f);
    y_i = (y_A * (1.0 - f)) + (y_B * f);
    w_i = (w_A * (1.0 - f)) + (w_B * f);
    h_i = (h_A * (1.0 - f)) + (h_B * f);
    updateCrop(x_i, y_i, w_i, h_i);
}
```

Once the time parameter is determined and the easing function is selected, the short calculation applied to the four key variables (x, y, w, h) produces the desired result. Over each iteration (video frame), the updated cropping parameters are provided to either a GPU or video buffer process to scale the video output properly. Over the time of the chosen number of frames the proper transition video effect is created.

Based on observations of transitions in videoconferencing settings, it has been determined that 80 frames (at 30 fps) using an ease in ease out function such as $f(t)=3t^2-2t^3$ or $f(t)=6t^5-15t^4+10t$ provides a pleasant transition. Other frame counts from 60 to 100 provide pleasant transitions, but 80 frames is most preferred. As frame counts exceed 100 frames, the transition begins to be perceived as too slow. If below 60, the transition is likely not to be perceived as a transition but instead to be perceived as a cut. Additionally, the number of frames can change based on the distance between scenes but keeping a constant number of frames provides a dynamic feel for the movement. If 60 fps is being used, the values are simply doubled. Various other functions can be used for the transition, as noted above, though functions with abrupt starting or stopping are generally considered undesirable. Many changes can be made to the coefficients and polynomials to provide other velocity curves that provide pleasant ease in and ease out.

Addressing the choice of moving versus cutting, in certain circumstances, it may be more appropriate to change the camera view instantly from Scene A to Scene B. Some of the following considerations are taken when deciding how to decide when to execute a smooth transition or perform a direct cut:

Will the smooth transition take too long?
Will the smooth transition travel too far?
Does the smooth transition cause dizziness or disorientation?
Does the direct cut cause disorientation?

It has been determined that as the intersection or overlap between two scenes (A and B) grows, direct cuts become more disorienting and smooth transitions are preferred. As the intersection shrinks and the overlap disappears, smooth transitions become more disorienting and direct cuts are preferred.

It has been determined that to balance the comfort level of the camera transitions, a simple calculation is applied to decide whether to move smoothly or cut directly between two scenes.

Evaluating the center points of Scenes A and B against the width and height of the current scene (Scene A) is used as an initial calculation to determine the threshold at which a cut or move operation is performed.

Figure 8:
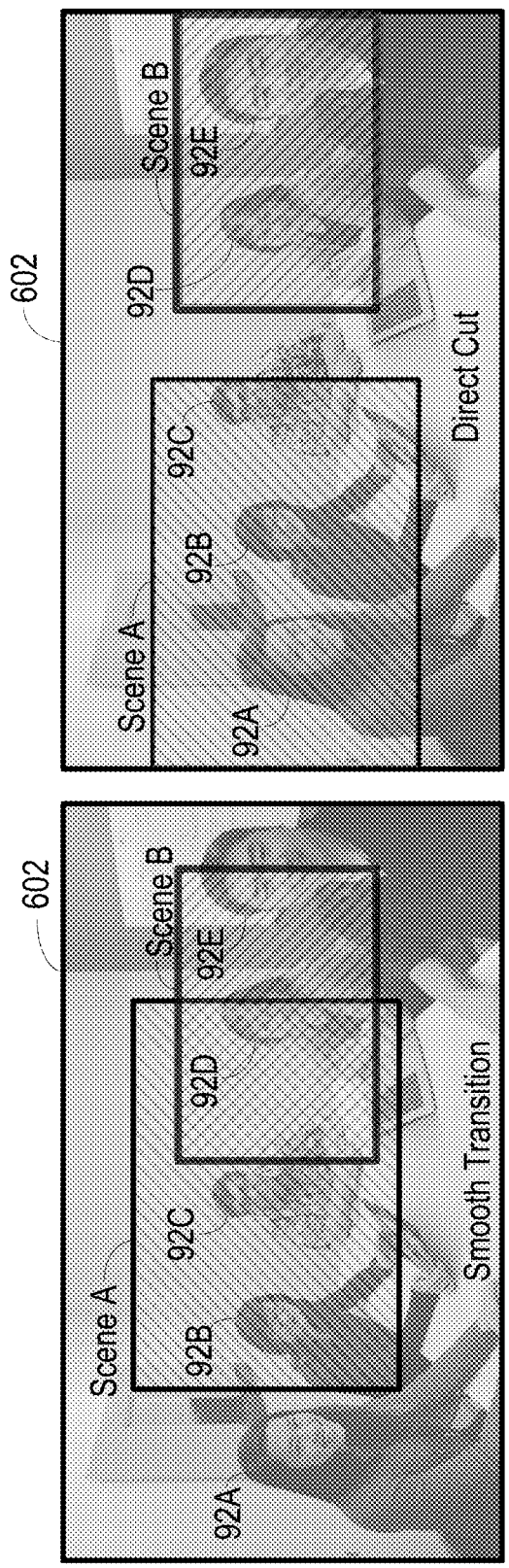
FIG. 8A illustrates a first relationship between two cropped scenes according to the present invention.
FIG. 8B illustrates a second relationship between two cropped scenes according to the present invention.

If the center point of Scene B lies outside of Scene A, then a direct cut is chosen; otherwise a smooth transition is applied. The difference is shown in FIGS. 8A and 8B. In FIG. 8A, the cropped area is centered on individual 92C as the speaker and includes individuals 92B and 92D at the edges. Individual 92D becomes the speaker, so the cropped area needs to move to position B, where individual 92D is shown in the center. Because the center of Scene B is inside the Scene A boundary, a smooth transition using an ease in ease out function is used for the transition. In FIG. 8B, individual 92A is the speaker and then individual 92E becomes the speaker. As Scene B is entirely outside of Scene A, a direct cut from Scene A to Scene B is used.

Figure 9:
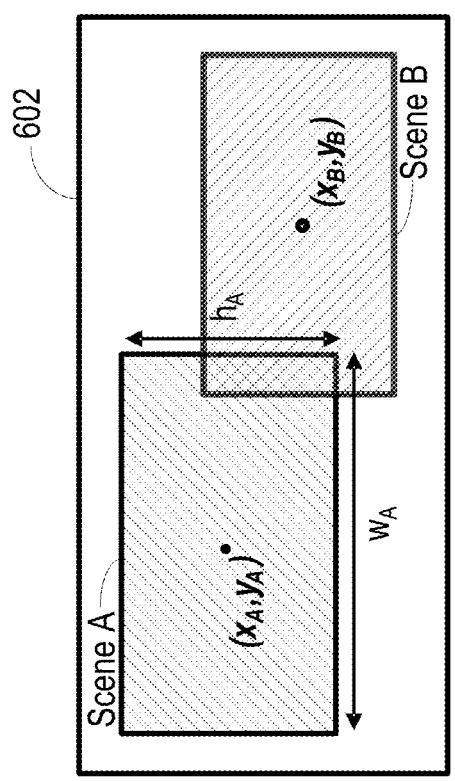
FIG. 9 illustrates dimensioning between tow cropped scenes according to the present invention.

FIG. 9 illustrates the variables and the decision is determined by the following pseudocode:

```
if (ABS(xA - xB) > WA/2 || ABS(yA - yB) > hA/2) then
   executeDirectCut( );
else
   executeSmoothTransition( );
endif
```

Offsets for w and h (wo, ho) are used to modify the overlap toleration. If zero is used for both, the effective maximum overlap allowed is essentially ¼ of the area of the current field of view. As the offset values approach the w, h values of Scene B (wB, hB) then the new scene has to lie entirely outside of the current scene to trigger a direct cut transition.

$$ABS(xA-xB) > (wA/2) + 11 \; ABS(yA-YB) > (hA/2) + ho$$

Another method to calculate this tolerance is to calculate the area of the intersection of the two scenes and base the decision on a value directly related to that value. As the two approaches produce equivalent results, the simpler calculation and conditional is generally preferred.

Figure 10:
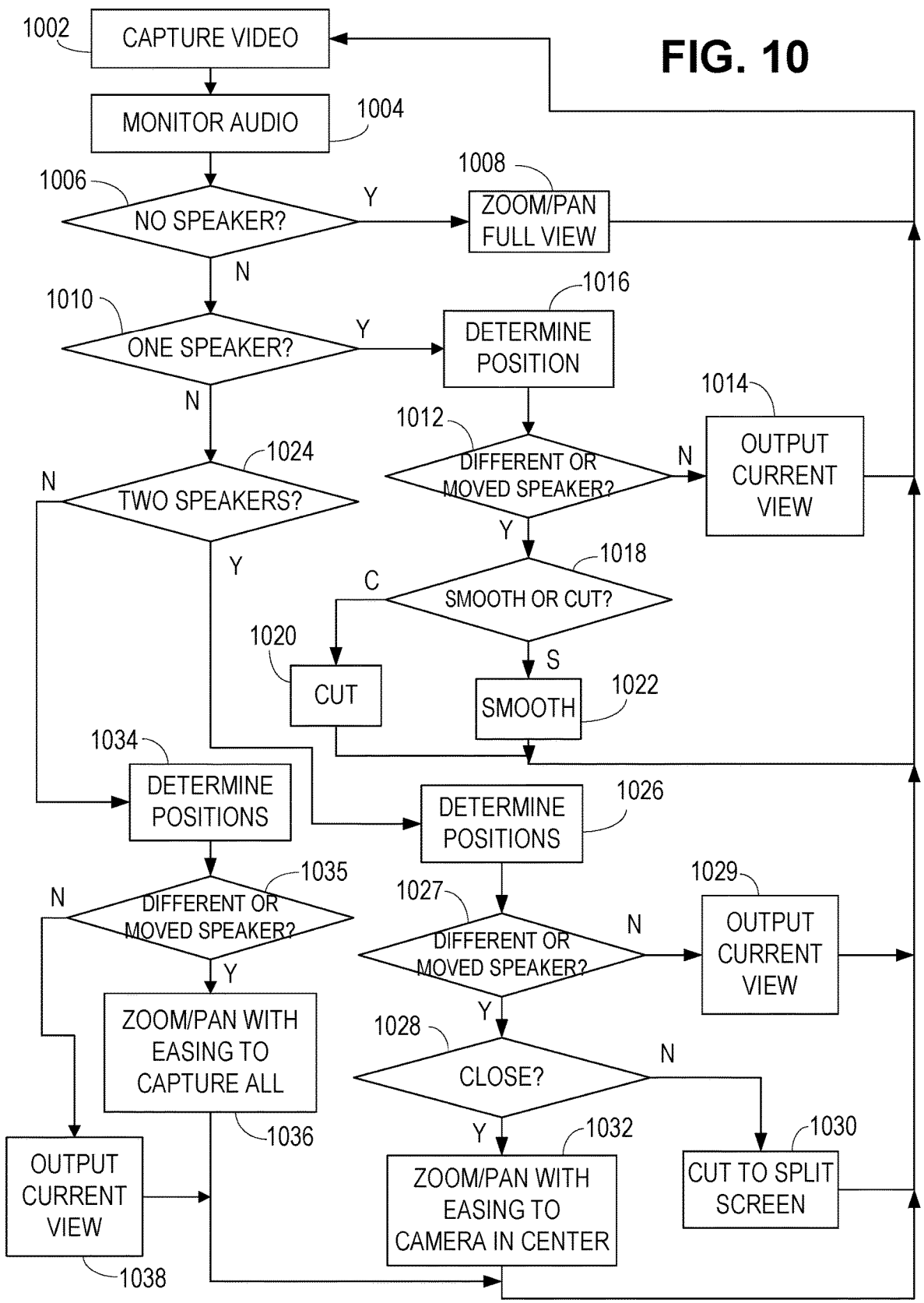
FIG. 10 is a flowchart of determining views of a videoconferencing endpoint according the present invention.

Referring now to FIG. 10, a flowchart illustrating the operations of determining a particular view is shown. The flowchart illustrates the operation of the control module 40 cooperating with the audio module 20 and the video module 30 or the control scheme 150 cooperating with the video processing 160 and the audio processing 170. In step 1002 video is captured from the camera. In step 1004 the received audio is monitored. In step 1006 it is determined if there is no speaker at the near end. If no speaker, in step 1008 the view is zoomed and panned to provide the full view of the camera. Operation returns to step 1002.

If there is a speaker in step 1006, in step 1010 it is determined if there is only one speaker. If so, in step 1016 the position of the speaker is determined. It is determined in step 1012 whether it is a different speaker or the speaker has moved. If not, in step 1014 the current view is output. If it is a new speaker, in step 1018 the decision between a smooth transition or a cut is made as described above. If it is determined that a cut is appropriate, in step 1020 a cut is made to provide the new view and operation returns to step 1002. If it is a smooth transition, in step 1022 the easing function is selected and put into operation to transition to the new speaker or location. Operation returns to step 1002.

If it is not just one speaker as determined in step 1010, in step 1024 it is determined if there are two speakers. If so, in step 1026 the positions of the two speakers are determined. In step 1027 it is determined if there is a different speaker or a speaker has moved. If no different speakers and none have moved, in step 1029 the current view is selected for output. If the speakers are different or have moved, in step 1028 it is determined if the two speakers are close together. Determining close together has a number of factors. Some of the factors include avoiding having the same or overlapping backdrop on either side of the split in a split screen view, avoiding having the outstretched arms of the user appear to need to invade the other side of the split and having the speakers being more than half of the screen field of view apart. If they are not close together, in step 1030 the two speakers are displayed using a cut to a split screen view, including adding looking space if the two speakers are facing each other, rather than just abutting two cropped speaker views. Many factors are used to determine the amount of added looking space. In one example, the speakers are aligned with the left and right thirds of the screen, leaving 50% to 67% of the screen width as the spacing, though speaker size and other adjustments may change the actual amount. Operation returns to step 1002. If the two speakers are close, in step 1032 the view is zoomed and panned with easing to capture both speakers, with the camera located in the center.

If there are not just two speakers in step 1024, in step 1034 the positions of the speakers are determined. In step 1035 it is determined if there is a different speaker or one of the speakers has moved. If so, in step 1036 the view is zoomed and panned with easing to capture all of the speakers at the near end. If there are no different speakers or none have moved, then in step 1038 the current view is selected and operation returns to step 1002.

For simplicity, the above operations are just the view change logic and all assume that changes in views are only made after appropriate waiting periods at a particular view and that speakers are talking for periods sufficient for a view change to be made.

While the description has focused on an endpoint doing the various determinations and transitions, the determinations can also be done in a multipoint control unit (MCU) which is developing views to provide various endpoints. The MCU receives the full camera view and then develops the various views in a similar fashion, particularly if the conference is operating in speaker view mode, but also in continuous presence modes as well.

Therefore, scene changes, especially using an EPTZ camera, are done pleasingly and without user input or control. Based on the number of speakers and changes in speakers, either to a different individual or movement by the same speaker, based on the locations of the speakers and the overlap of the current and intended scenes, the decision is made whether to perform a smooth transition or do a cut. It has been determined that the decision on cut versus smooth transition is preferably based on the location of the center of the intended new scene versus the boundaries of the current scene, a cut used if the center is outside the boundaries and a smooth transition if inside. If a smooth transition is to be performed, an easing function, preferably an ease in ease out function, is performed to change the scene. It has also been determined that a preferred value for the smooth transition is to perform the transition over 80 frames, though values of 60-100 frames is also suitable to provide a pleasant viewing experience, assuming 30 fps operations.

Various changes in the details of the illustrated operational methods are possible without departing from the scope of the following claims. For instance, illustrative flow chart steps or process steps may perform the identified steps in an order different from that disclosed here. Alternatively, some embodiments may combine the activities described herein as being separate steps. Similarly, one or more of the described steps may be omitted, depending upon the specific operational environment in which the method is being implemented.

In addition, acts in accordance with flow chart or process steps may be performed by a programmable control device executing instructions organized into one or more program modules on a non-transitory programmable storage device. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Non-transitory programmable storage devices, sometimes called a computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof

What is claimed is:

1. A method for operating a videoconferencing device for transitioning between scenes of a room captured by an electronic pan, tilt, and zoom (EPTZ) camera with a view of the room and to be transmitted over a network in a videoconference, the method comprising:
   determining a number of speakers in the room;
   determining positions of any speakers in the room;
   based on a change in the number of speakers or a change in the positions of the any speakers in the room, determine a need to transition a present scene to a new scene;
   based on the number of speakers in the room, the positions of the any speakers in the room and the need to transition to the new scene, determine if the transition should be smooth or a cut;
   performing the transition to the new scene based on the smooth or cut determination; and
   transmitting the new scene to another videoconferencing device for display.

2. The method of claim 1, wherein it is determined that there is one speaker,
   wherein it is determined that the one speaker is a different speaker or in a different location,
   wherein it is determined to transition to the new scene, and
   wherein the determination if the transition should be smooth or a cut is based on determining if a center of the new scene is within boundaries of the present scene, smooth being used if the center of the new scene is within the boundaries of the present scene and cut being used if the center of the new scene is not within the boundaries of the present scene.

3. The method of claim 1, wherein it is determined that there are two speakers,
   wherein it is determined that one of the two speakers is a different speaker or in a different location,
   wherein it is determined to transition to the new scene,
   wherein the determination if the transition should be smooth or a cut is based on determining if the two speakers are close, smooth being used if the two speakers are close and cut if the two speakers are not close,
   wherein a smooth transition results in a scene with a camera view being in the center of the two speakers, and
   wherein a cut transition results in a split screen scene of the two speakers, with looking space added to the split screen if the two speakers are facing each other.

4. The method of claim 3, wherein it is determined that there is one speaker,
   wherein it is determined that the one speaker is a different speaker or in a different location,
   wherein it is determined to transition to the new scene, and
   wherein the determination if the transition should be smooth or a cut is based on determining if the center of the new scene is within boundaries of the present scene, smooth being used if the center of the new scene is within the boundaries of the present scene and cut being used if the center of the new scene is not within the boundaries of the present scene.

5. The method of claim 1, wherein it is determined that there are more than two speakers,
   wherein it is determined that one of the more than two speakers is a different speaker or in a different location,
   wherein it is determined to transition to the new scene,
   wherein the determination if the transition should be smooth or a cut is always smooth, and
   wherein a smooth transition results in a scene with a camera view capturing all of the speakers.

6. The method of claim 5, wherein it is determined that there is one speaker,
   wherein it is determined that the one speaker is a different speaker or in a different location,
   wherein it is determined to transition to the new scene, and
   wherein the determination if the transition should be smooth or a cut is based on determining if the center of the new scene is within boundaries of the present scene, smooth being used if the center of the new scene is within the boundaries of the present scene and cut being used if the center of the new scene is not within the boundaries of the present scene.

7. The method of claim 6, wherein it is determined that there are two speakers,
wherein it is determined that one of the two speakers is a different speaker or in a different location,
wherein it is determined to transition to the new scene,
wherein the determination if the transition should be smooth or a cut is based on determining if the two speakers are close, smooth being used if the speakers are close and cut if the speakers are not close,
wherein a smooth transition results in a scene with a camera view being in the center of the two speakers, and
wherein a cut transition results in a split screen scene of the two speakers, with looking space added to the split screen if the speakers are facing each other.

8. A non-transitory program storage device, readable by one or more processors in a videoconferencing device and comprising instructions stored thereon to cause the one or more processors to perform a method for operating the videoconferencing device for transitioning between scenes of a room captured by an electronic pan, tilt, and zoom (EPTZ) camera with a view of the room and to be transmitted over a network in a videoconference, the method comprising the steps of:
determining a number of speakers in the room;
determining positions of any speakers in the room;
based on a change in the number of speakers or a change in the positions of the any speakers in the room, determining a need to transition a present scene to a new scene;
based on the number of speakers in the room, the positions of the any speakers in the room, and the need to transition to the new scene, determining if the transition should be smooth or a cut;
performing the transition to the new scene based on the smooth or cut determination; and
transmitting the new scene to another videoconferencing device for display.

9. The non-transitory program storage device of claim 8, wherein it is determined that there is one speaker,
wherein it is determined that the one speaker is a different speaker or in a different location,
wherein it is determined to transition to the new scene, and
wherein the determination if the transition should be smooth or a cut is based on determining if a center of the new scene is within boundaries of the present scene, smooth being used if the center of the new scene is within the boundaries of the present scene and cut being used if the center of the new scene is not within the boundaries of the present scene.

10. The non-transitory program storage device of claim 8, wherein it is determined that there are two speakers,
wherein it is determined that one of the two speakers is a different speaker or in a different location,
wherein it is determined to transition to the new scene,
wherein the determination if the transition should be smooth or a cut is based on determining if the two speakers are close, smooth being used if the speakers are close and cut if the speakers are not close,
wherein a smooth transition results in a scene with a camera view being in the center of the two speakers, and
wherein a cut transition results in a split screen scene of the two speakers, with looking space added to the split screen if the speakers are facing each other.

11. The non-transitory program storage device of claim 10, wherein it is determined that there is one speaker,
wherein it is determined that the one speaker is a different speaker or in a different location,
wherein it is determined to transition to the new scene, and
wherein the determination if the transition should be smooth or a cut is based on determining if the center of the new scene is within boundaries of the present scene, smooth being used if the center of the new scene is within the boundaries of the present scene and cut being used if the center of the new scene is not within the boundaries of the present scene.

12. The non-transitory program storage device of claim 8, wherein it is determined that there are more than two speakers,
wherein it is determined that one of the more than two speakers is a different speaker or in a different location,
wherein it is determined to transition to the new scene,
wherein the determination if the transition should be smooth or a cut is always smooth, and
wherein a smooth transition results in a scene with a camera view capturing all of the speakers.

13. The non-transitory program storage device of claim 12, wherein it is determined that there is one speaker,
wherein it is determined that the one speaker is a different speaker or in a different location,
wherein it is determined to transition to the new scene, and
wherein the determination if the transition should be smooth or a cut is based on determining if the center of the new scene is within boundaries of the present scene, smooth being used if the center of the new scene is within the boundaries of the present scene and cut being used if the center of the new scene is not within the boundaries of the present scene.

14. The non-transitory program storage device of claim 13, wherein it is determined that there are two speakers,
wherein it is determined that one of the two speakers is a different speaker or in a different location,
wherein it is determined to transition to the new scene,
wherein the determination if the transition should be smooth or a cut is based on determining if the two speakers are close, smooth being used if the two speakers are close and cut if the two speakers are not close,
wherein a smooth transition results in a scene with a camera view being in the center of the two speakers, and
wherein a cut transition results in a split screen scene of the two speakers, with looking space added to the split screen if the two speakers are facing each other.

15. A videoconferencing device for transitioning between scenes of a room captured by an electronic pan, tilt, and zoom (EPTZ) camera with a view of the room and to be transmitted over a network in a videoconference, the videoconferencing device comprising:
the EPTZ camera for providing a view of the room and having an output; a microphone providing the output for allowing determination of speaker location;
a network interface for interacting with another videoconferencing device;

a processor coupled to the network interface, the EPTZ camera and the microphone and receiving the output from each; and a memory coupled to the processor and including programs that when executed cause the processor to perform a method of operating the videoconferencing device for transitioning between the scenes of the room to be transmitted over the network in the videoconference, the method comprising the steps of:

determining a number of speakers in the room;

determining positions of any speakers in the room;

based on a change in the number of speakers or a changed in the positions of the any speakers in the room, determining a need to transition a present scene to a new scene;

based on the number of speakers in the room, the positions of the any speakers in the room and the need to transition to the new scene, determining if the transition should be smooth or a cut;

performing the transition to the new scene based on the smooth or cut determination; and providing the new scene to the network interface for transmission to the other videoconferencing device for display.

16. The videoconferencing device of claim 15, wherein it is determined that there is one speaker, wherein it is determined that the one speaker is a different speaker or in a different location, wherein it is determined to transition to the new scene, and wherein the determination if the transition should be smooth or a cut is based on determining if a center of the new scene is within boundaries of the present scene, smooth being used if the center of the new scene is within the boundaries of the present scene and cut being used if the center of the new scene is not within the boundaries of the present scene.

17. The videoconferencing device of claim 15, wherein it is determined that there are two speakers, wherein it is determined that one of the two speakers is a different speaker or in a different location, wherein it is determined to transition to the new scene, wherein the determination if the transition should be smooth or a cut is based on determining if the two speakers are close, smooth being used if the two speakers are close and cut if the two speakers are not close, wherein a smooth transition results in a scene with a camera view being in the center of the two speakers, and wherein a cut transition results in a split screen scene of the two speakers, with looking space added to the split screen if the two speakers are facing each other.

18. The videoconferencing device of claim 17, wherein it is determined that there is one speaker, wherein it is determined that the one speaker is a different speaker or in a different location, wherein it is determined to transition to the new scene, and wherein the determination if the transition should be smooth or a cut is based on determining if the center of the new scene is within boundaries of the present scene, smooth being used if the center of the new scene is within the boundaries of the present scene and cut being used if the center of the new scene is not within the boundaries of the present scene.

19. The videoconferencing device of claim 15, wherein it is determined that there are more than two speakers, wherein it is determined that one of the more than two speakers is a different speaker or in a different location, wherein it is determined to transition to the new scene, wherein the determination if the transition should be smooth or a cut is always smooth, and wherein a smooth transition results in a scene with a camera view capturing all of the more than two speakers.

20. The videoconferencing device of claim 19, wherein it is determined that there is one speaker, wherein it is determined that the one speaker is a different speaker or in a different location, wherein it is determined to transition to the new scene, wherein the determination if the transition should be smooth or a cut is based on determining if the center of the new scene is within boundaries of the present scene, smooth being used if the center of the new scene is within the boundaries of the present scene and cut being used if the center of the new scene is not within the boundaries of the present scene, wherein it is determined that there are two speakers, wherein it is determined that one of the two speakers is a different speaker or in a different location, wherein it is determined to transition to the new scene, wherein the determination if the transition should be smooth or a cut is based on determining if the two speakers are close, smooth being used if the two speakers are close and cut if the two speakers are not close, wherein a smooth transition results in a scene with a camera view being in the center of the two speakers, and wherein a cut transition results in a split screen scene of the two speakers, with looking space added to the split screen if the two speakers are facing each other.

* * * * *